United States Patent
Kajino et al.

(10) Patent No.: US 10,011,202 B2
(45) Date of Patent: Jul. 3, 2018

(54) SEAT CUSHION ADJUSTING APPARATUS

(71) Applicant: Aisin Seiki Kabushiki Kaisha, Kariya-shi (JP)

(72) Inventors: Yusuke Kajino, Nagoya (JP); Masatoshi Mori, Anjo (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 92 days.

(21) Appl. No.: 15/156,410

(22) Filed: May 17, 2016

(65) Prior Publication Data

US 2016/0339820 A1 Nov. 24, 2016

(30) Foreign Application Priority Data

May 20, 2015 (JP) ................................ 2015-102755

(51) Int. Cl.
| | |
|---|---|
| *A47C 3/00* | (2006.01) |
| *B60N 2/62* | (2006.01) |
| *B60N 2/90* | (2018.01) |
| *B60N 2/02* | (2006.01) |
| *B60N 2/44* | (2006.01) |
| *A47C 7/14* | (2006.01) |

(52) U.S. Cl.
CPC .................. *B60N 2/62* (2013.01); *A47C 7/14* (2013.01); *B60N 2/0284* (2013.01); *B60N 2/4495* (2013.01); *B60N 2/933* (2018.02); *B60N 2/995* (2018.02); *B60N 2002/024* (2013.01); *B60N 2002/0236* (2013.01); *B60N 2205/20* (2013.01)

(58) Field of Classification Search
CPC ........ B60N 2/02; B60N 2/0284; B60N 2/443; B60N 2/4435; B60N 2002/0236; B60N 2002/4425; B60N 2205/30; B60N 2205/35; A47C 7/14
USPC ............................ 297/284.11, 423.29, 284.1
See application file for complete search history.

(56) References Cited

U.S. PATENT DOCUMENTS

| | | | | |
|---|---|---|---|---|
| 5,467,957 A | * | 11/1995 | Gauger ................. | B60N 2/0232 248/429 |
| 6,095,610 A | * | 8/2000 | Okajima ............... | B60N 2/4495 297/423.2 |
| 6,464,421 B1 | * | 10/2002 | Kiefer .................. | B60N 2/0224 403/21 |

(Continued)

FOREIGN PATENT DOCUMENTS

| | | |
|---|---|---|
| DE | 102 62 266 B4 | 8/2013 |
| FR | 3 005 008 A1 | 10/2014 |

(Continued)

OTHER PUBLICATIONS

Extended European Search Report dated Oct. 14, 2016 in Patent Application No. 16170188.3.

*Primary Examiner* — Chi Q Nguyen
(74) *Attorney, Agent, or Firm* — Oblon, McClelland, Maier & Neustadt, L.L.P.

(57) ABSTRACT

A seat cushion adjusting apparatus includes: a nut support mechanism that supports a nut member on a frame of a seat cushion; and a variable mechanism that changes a length of the seat cushion based on an axial movement of a screw shaft screwed to the nut member, wherein the nut support mechanism allows the nut member and the screw shaft to be integrally tilted while restricting rotation of the nut member.

10 Claims, 8 Drawing Sheets

(56) References Cited

U.S. PATENT DOCUMENTS

| | | | | |
|---|---|---|---|---|
| 7,229,134 B2* | 6/2007 | Ito | ........................ | B60N 2/0232 297/423.26 |
| 7,614,693 B2* | 11/2009 | Ito | ........................ | B60N 2/0284 297/284.11 |
| 7,971,937 B2* | 7/2011 | Ishii | ..................... | B60N 2/0232 297/330 |
| 8,128,167 B2* | 3/2012 | Zhong | ...................... | B60N 2/62 297/284.11 |
| 2005/0012377 A1* | 1/2005 | Ito | ........................ | B60N 2/0232 297/423.26 |
| 2009/0033134 A1 | 2/2009 | Hofmann et al. | | |
| 2009/0039690 A1* | 2/2009 | Simon | .................. | B60N 2/0224 297/344.1 |
| 2009/0195041 A1* | 8/2009 | Ito | ........................ | B60N 2/0284 297/337 |
| 2010/0259081 A1* | 10/2010 | Kuno | ................... | B60N 2/2209 297/284.4 |
| 2011/0006573 A1* | 1/2011 | Arakawa | ............... | B60N 2/0232 297/284.11 |
| 2012/0091779 A1* | 4/2012 | Chang | .................. | B60N 2/4495 297/423.3 |
| 2014/0203617 A1 | 7/2014 | Line et al. | | |

FOREIGN PATENT DOCUMENTS

| | | |
|---|---|---|
| JP | 2009-279952 | 12/2009 |
| JP | 2011-15867 | 1/2011 |

* cited by examiner

SEAT CUSHION ADJUSTING APPARATUS

CROSS REFERENCE TO RELATED APPLICATIONS

This application is based on and claims priority under 35 U.S.C. § 119 to Japanese Patent Application 2015-102755, filed on May 20, 2015, the entire contents of which are incorporated herein by reference.

TECHNICAL FIELD

This disclosure relates to a seat cushion adjusting apparatus.

BACKGROUND DISCUSSION

Conventionally, there is a seat cushion adjusting apparatus capable of adjusting a length (longitudinal length) of a seat cushion based on an axial movement of a screw shaft screwed to a nut member. For example, a configuration, in which a nut member is driven to be rotated by an actuator supported by a frame of a seat cushion, is disclosed in JP 2011-15867A (Reference 1). In addition, a configuration, in which a screw shaft is driven to be rotated by an actuator supported on a movable side of a cushion length variable mechanism, is disclosed in US 2009/0033134A (Reference 2). That is, in these cushion length variable mechanisms, the screw shaft is moved in the seat longitudinal direction, i.e., in the length direction of the seat cushion, based on a screw relationship (screw pairing) between the screw shaft and the nut member. Then, according to this movement, a seating surface of the seat cushion is extended to the front side and retracted to the rear side, thereby the length of the seat cushion is changed.

However, in the seat cushion adjusting apparatus described above, one end of the screw shaft is depressed based on a seat load acting on a front end portion of the seat cushion and thereby an axis of the screw shaft may be inclined with respect to an axis of the nut member. Then, there is a concern that a smooth operation of the cushion length variable mechanism is hindered by an increase in frictional resistance generated thereby. In this regard, it leaves room for improvement.

SUMMARY

Thus, a need exists for a seat cushion adjusting apparatus which is not suspectable to the drawback mentioned above It is preferable that a seat cushion adjusting apparatus according to an aspect of this disclosure includes a nut support mechanism that supports a nut member on a frame of a seat cushion; and a variable mechanism that changes a length of the seat cushion based on an axial movement of a screw shaft screwed to the nut member. The nut support mechanism preferably allows the nut member and the screw shaft to be integrally tilted while restricting rotation of the nut member.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

First Embodiment

Hereinafter, a first embodiment according to a seat cushion adjusting apparatus will be described with reference to the drawings.

Figure 1:
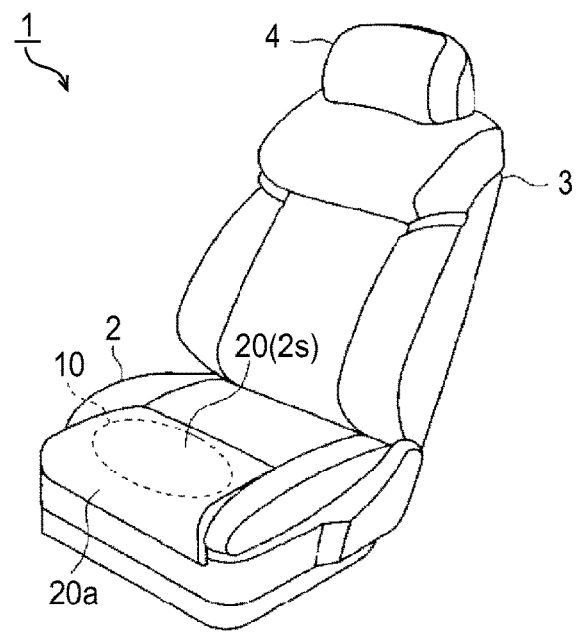
FIG. 1 is a perspective view of a vehicle seat including a seat cushion adjusting apparatus.

As illustrated in FIG. 1, a vehicle seat 1 includes a seat cushion 2 and a seat back 3 provided in a rear end portion of the seat cushion 2. In addition, a head rest 4 is provided in an upper end of the seat back 3. Then, a seat cushion adjusting apparatus 10 capable of adjusting a length of the seat cushion 2 is provided in the seat 1.

More specifically, in the seat 1 of the embodiment, a seating member 20 forming a seating surface 2s of the seat cushion 2 is configured such that a front end portion 20a becomes a free end having flexibility. Specifically, the seating member 20 of the embodiment has the front end portion 20a disposed in a form of being hung downward from the seating surface 2s in a leading edge portion of the seat cushion 2. Then, the seat cushion adjusting apparatus 10 of the embodiment is configured such that the length of the seat cushion 2 is able to extend by extruding forward the front end portion 20a of the seating member 20 in a manner to lift the front end portion 20a of the seating member 20.

Figure 2:
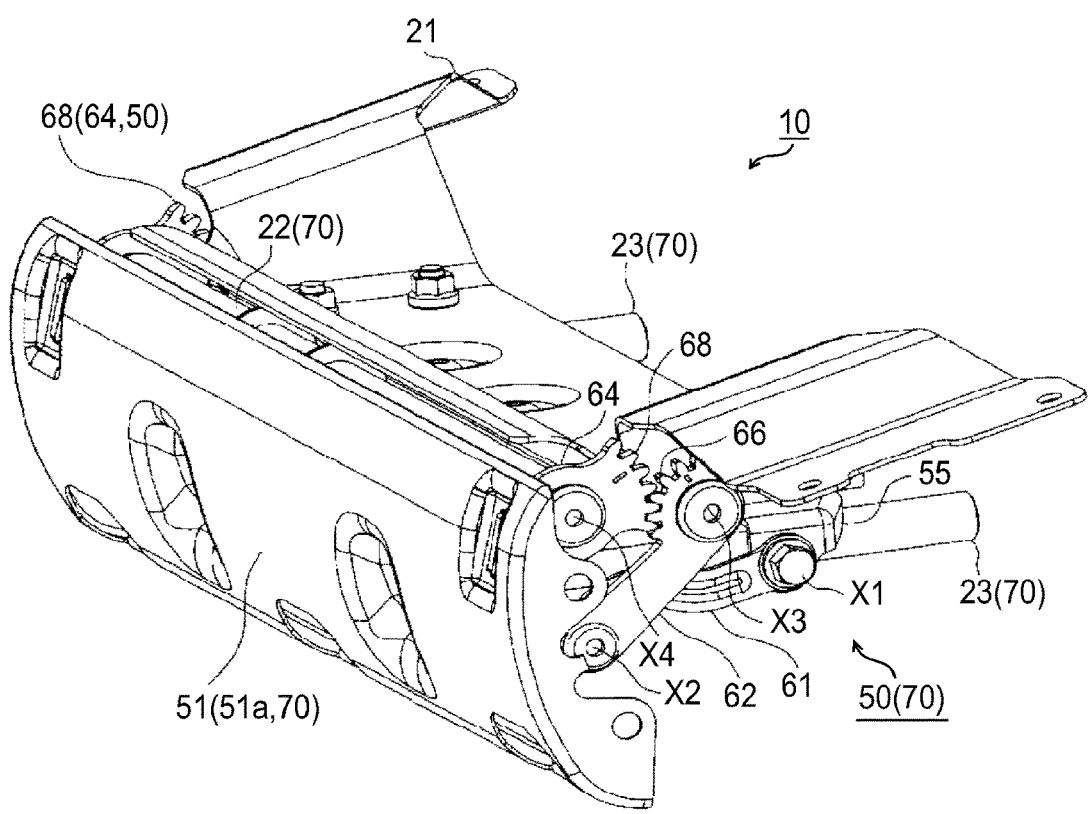
FIG. 2 is a perspective view of the seat cushion adjusting apparatus (front portion viewed from above and in stored state)
Figure 3:
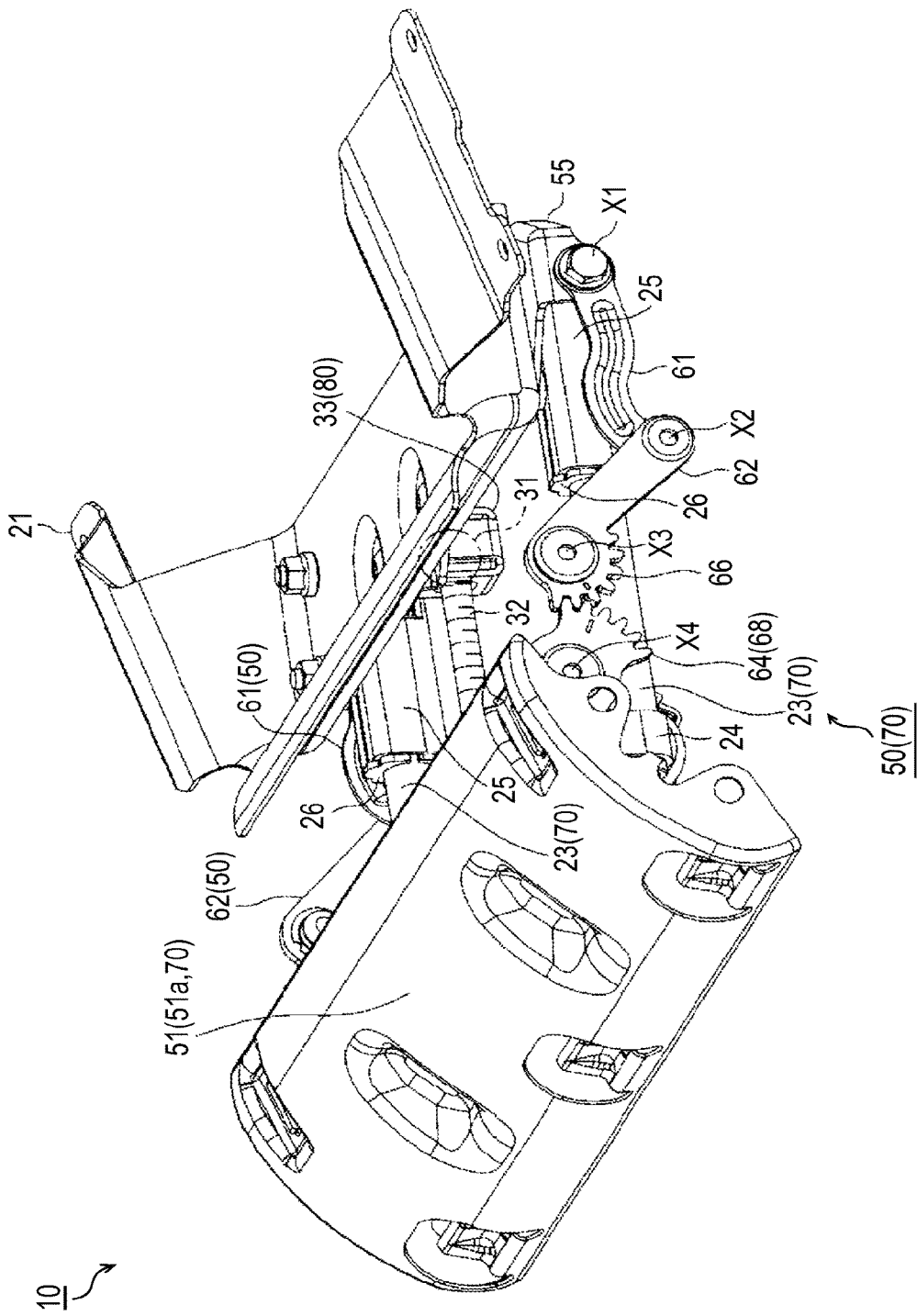
FIG. 3 is a perspective view of the seat cushion adjusting apparatus (front portion viewed from above and in expanded state)
Figure 4:
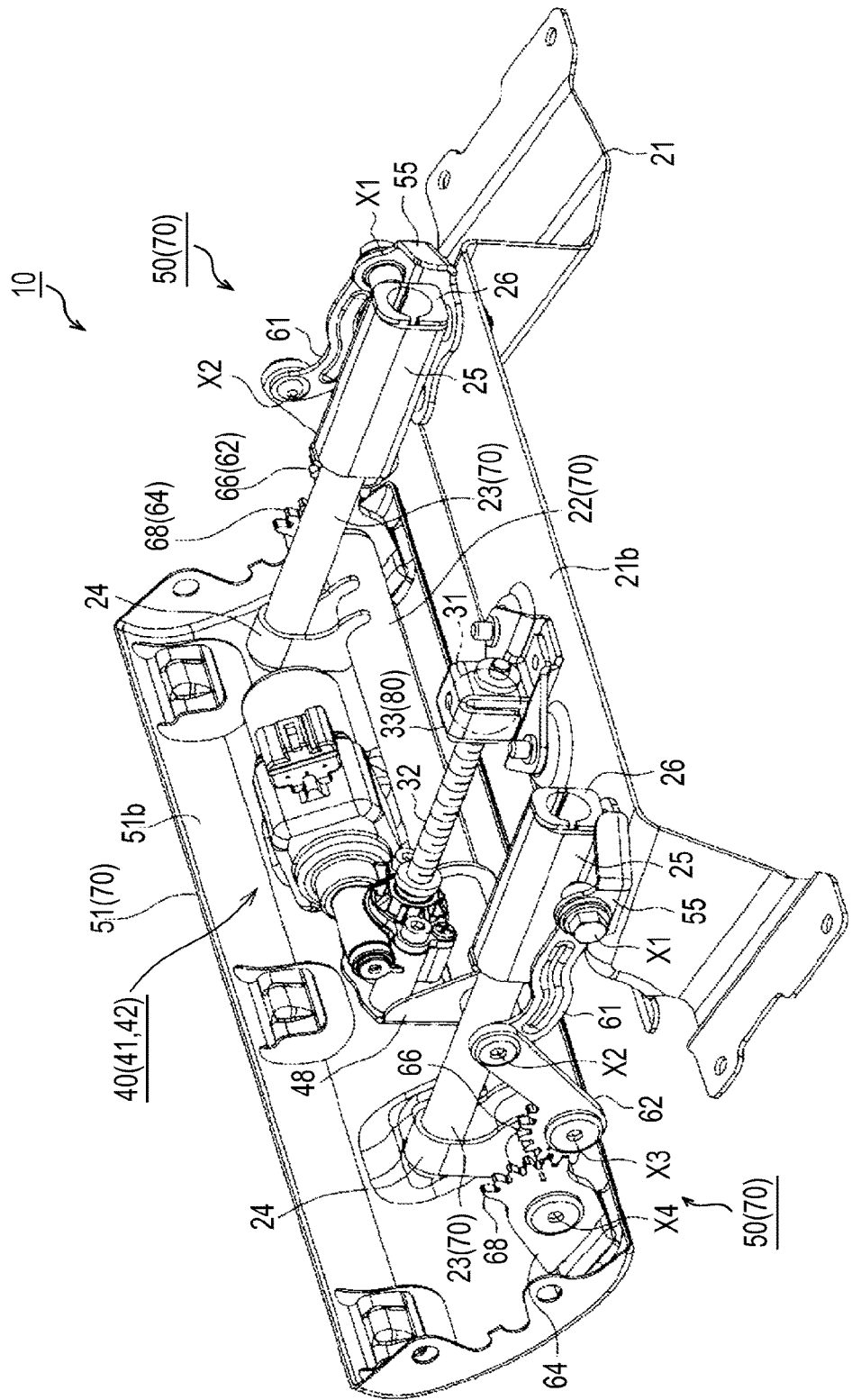
FIG. 4 is a perspective view of the seat cushion adjusting apparatus (rear portion viewed from below and in expanded state)

More specifically, as illustrated in FIGS. 2 to 4, the seat cushion adjusting apparatus 10 of the embodiment includes a panel member 21 forming a frame of the seat cushion 2 by being fixed to side frames (not illustrated) of the seat cushion 2. Then, the seating member 20 of the embodiment is configured to form the seating surface 2s of the seat cushion 2 by being supported on an upper portion (upper side in FIGS. 2 and 3) of the panel member 21.

In addition, the seat cushion adjusting apparatus 10 of the embodiment includes a center pipe 22 extending in a seat width direction and a pair of right and left support shafts (stays) 23 fixed to both end portions of the center pipe 22 in an axial direction. Each support shaft 23 of the embodiment extends along a seat longitudinal direction that is a longitudinal direction of the seat cushion 2 and a front end thereof is fixed to the center pipe 22 via a fixing bracket 24. Then, a pair of right and left support brackets 25 are fixed to a lower surface 21b of the panel member 21 to slidably support each support shaft 23.

Specifically, similar to the center pipe 22, each support shaft 23 of the embodiment is formed of a pipe material. In addition, each support bracket 25 has a substantially square cylindrical outer shape. Furthermore, a guide member 26 made of resin is disposed within each support bracket 25. That is, each support shaft 23 of the embodiment is supported on a lower portion of the panel member 21 in a state in which a rear end thereof is inserted into each support bracket 25. Therefore, the seat cushion adjusting apparatus 10 of the embodiment is configured such that each support shaft 23 is moved in the longitudinal direction integrally with the center pipe 22 fixed to the front end thereof.

Figure 5:
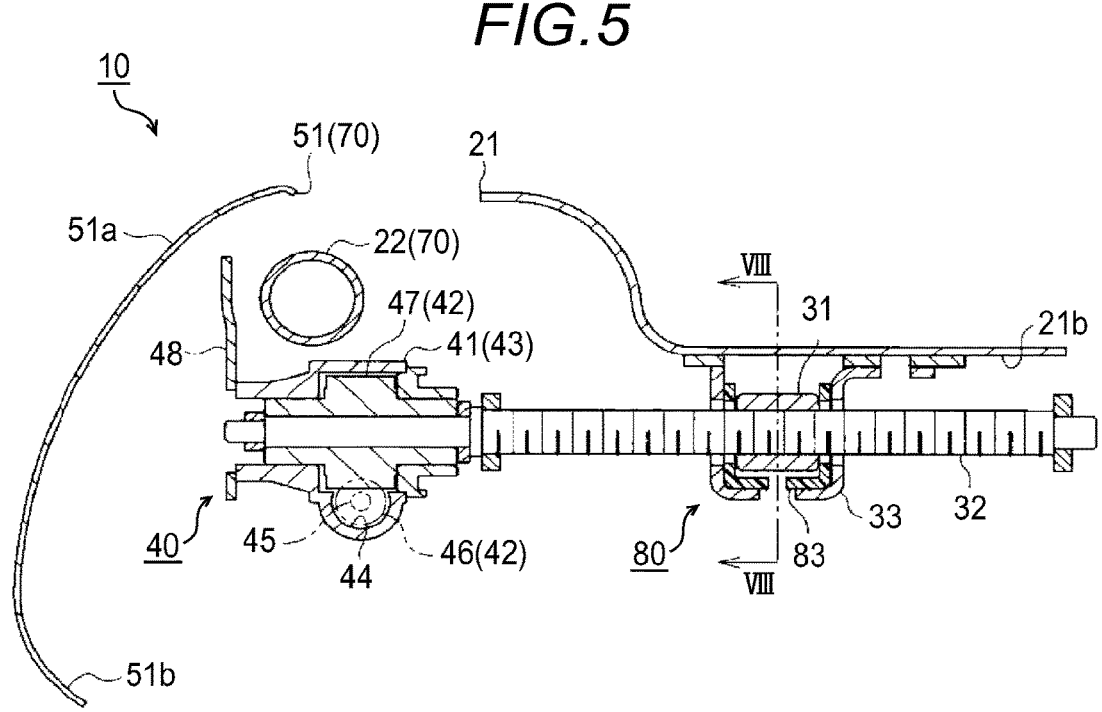
FIG. 5 is a sectional view of the seat cushion adjusting apparatus along an axis of a screw shaft.

In addition, as illustrated in FIGS. 3 to 5, the seat cushion adjusting apparatus 10 of the embodiment includes a nut member 31 supported on the lower portion of the panel member 21 and a screw shaft (screw) 32 screwed into the nut member 31. In the seat cushion adjusting apparatus 10 of the embodiment, the nut member 31 is held by a holding bracket 33 fixed to the lower surface 21b of the panel member 21 and thereby a rotation around an axis thereof is restricted. Then, the screw shaft 32 is disposed substantially parallel to each support shaft 23 by being screwed into the nut member 31.

Furthermore, as illustrated in FIGS. 4 and 5, the seat cushion adjusting apparatus 10 of the embodiment includes an actuator 40 for driving the screw shaft 32 to be rotated. Rotation of a motor 41 that is a driving source is decelerated by a reduction gear 42 and then the actuator 40 of the embodiment transmits the rotation to the screw shaft 32. Specifically, the actuator 40 of the embodiment is configured to integrally store the reduction gear 42 in a gear storing chamber 44 formed on one end of a motor housing 43. In addition, the reduction gear 42 of the embodiment is configured of a worm gear 46 integrally rotating with a motor shaft 45 and a helical gear 47 integrally rotating with the screw shaft 32 in a state of being engaged with the worm gear 46. In addition, a holding bracket 48 is fixed to the center pipe 22. Then, the actuator 40 of the embodiment is configured to move in the longitudinal direction integrally with the center pipe 22 in which the holding bracket 48 is provided in a state in which the screw shaft 32 is driven to be rotated by being held by the holding bracket 48.

That is, in the seat cushion adjusting apparatus 10 of the embodiment, the screw shaft 32 is moved in the axial direction together with the center pipe 22 supporting the actuator 40 by being driven to be rotated by the actuator 40 based on a screw relationship (screw pairing) with the nut member 31. Then, the seat cushion adjusting apparatus 10 of the embodiment is configured to change the length of the seat cushion 2 based on the movement of the screw shaft 32 in the axial direction.

More specifically, as illustrated in FIGS. 2 to 4, the seat cushion adjusting apparatus 10 of the embodiment includes a pair of right and left gear links 50 having a connecting point (X4) with respect to the center pipe 22 and a drum 51 that is disposed on a front side of the center pipe 22 in a state of being supported on the center pipe 22 via the gear links 50.

As illustrated in FIGS. 2 to 5, in the seat cushion adjusting apparatus 10 of the embodiment, the drum 51 has a substantially curved plate shape extending in the seat width direction having a substantially arcuate cross section that is convex toward the front side. In addition, the drum 51 is configured such that a front surface 51a thereof is fixed to the front end portion 20a (rear surface 20s thereof) of the seating member 20 disposed in the leading edge portion of the seat cushion 2 in a manner to be hung downward from the seating surface 2s as described above. Then, each gear link 50 of the embodiment is configured to move the drum 51 in the longitudinal direction integrally with the center pipe 22 to which each gear link 50 is connected and to rotate the drum 51 in accordance with the movement in the longitudinal direction.

Figure 6:
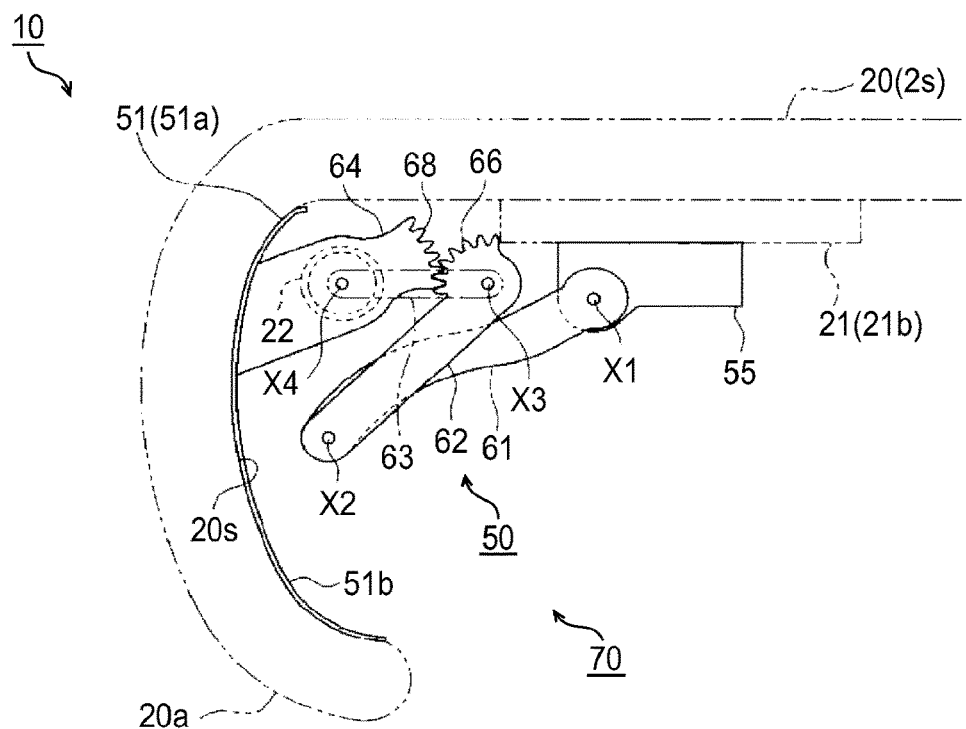
FIG. 6 is an explanatory view of a configuration and an operation of a gear link configuring a variable mechanism (stored state)
Figure 7:
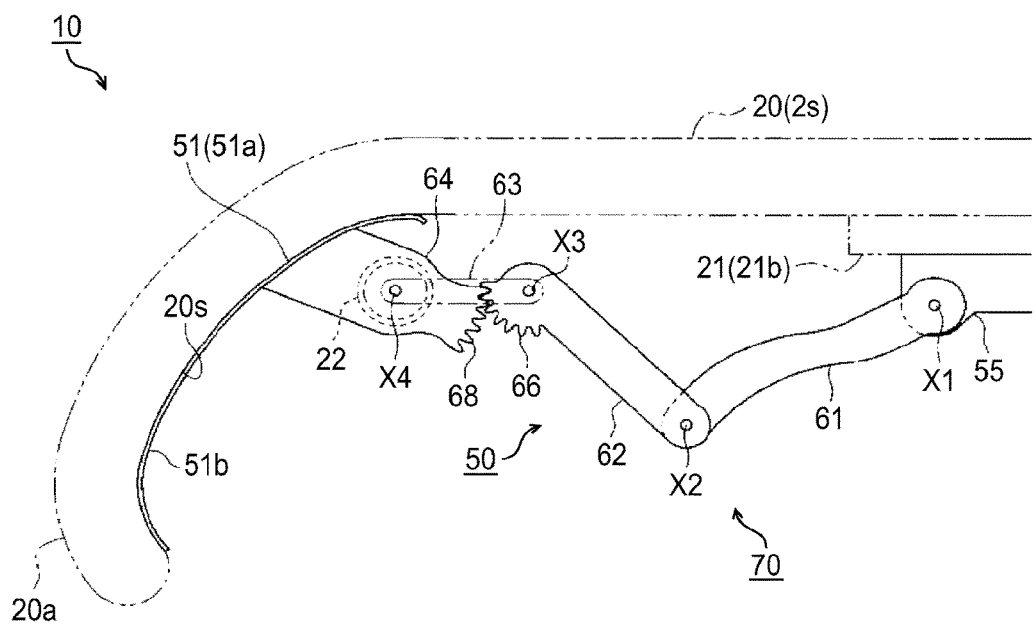
FIG. 7 is an explanatory view of the configuration and the operation of the gear link configuring the variable mechanism (expanded state)

Specifically, as illustrated in FIGS. 6 and 7, the gear link 50 of the embodiment includes a first link member 61 of which a base end portion is rotatably connected to a link bracket 55 fixed to the lower surface 21b of the panel member 21, and a second link member 62 of which a base end portion is rotatably connected to a front end portion of the first link member 61. In addition, the gear link 50 includes a third link member 63 of which a base end portion is rotatably connected to a front end portion of the second link member 62 and a front end portion is rotatably connected to a shaft end portion of the center pipe 22, and a fourth link member 64 that is rotatably connected to the shaft end portion of the center pipe 22 similar to the third link member 63. Furthermore, if the connecting points of each link member are referred to as "X1", "X2", "X3", and "X4" in order from the link bracket 55 positioned on the base end side of the gear link 50, the second link member 62 and the fourth link member 64 respectively have sector gears 66 and 68 engaged with each other about the connecting points X3 and X4 to the third link member 63 as rotation centers. Then, a front end portion of the fourth link member 64 is fixed to a rear surface 51b and thereby the drum 51 of the embodiment is configured to be supported on the center pipe 22 via the fourth link member 64.

That is, the center pipe 22 is moved forward (moving to the left side in each view) based on the movement of the screw shaft 32 in the axial direction and thereby the gear links 50 of the embodiment cause the drum 51 supported on the center pipe 22 via the fourth link member 64 to be moved forward integrally with the center pipe 22. In addition, in this case, the second link member 62 is rotated in the counterclockwise direction in each view about the connecting point X2 on the base end side as a rotation fulcrum. Furthermore, the fourth link member 64 is rotated in the clockwise direction in each view based on an engagement relationship between the sector gear 68 and the sector gear 66 provided in the second link member 62. Then, the seat cushion adjusting apparatus 10 of the embodiment is configured such that the drum 51 integrally rotating with the fourth link member 64 extrudes the front end portion 20a of the seating member 20 forward in the manner to lift the front end portion 20a of the seating member 20 from the rear surface 20s side and thereby the seating surface 2s of the seat cushion 2 formed by the seating member 20 extends forward.

In addition, the gear links 50 of the embodiment cause the fourth link member 64 and the drum 51 fixed to the fourth link member 64 to be moved rearward integrally with the center pipe 22 moving rearward (moving to the right side in each view) based on the movement of the screw shaft 32 in the axial direction. Furthermore, in this case, the second link member 62 is rotated in the clockwise direction in each view about the connecting point X2 on the base end side as the rotation fulcrum and the fourth link member 64 is rotated in the counterclockwise direction in each view based on the engagement relationship between the sector gear 68 and the sector gear 66 provided in the second link member 62. Then, the seat cushion adjusting apparatus 10 of the embodiment is configured such that the drum 51 integrally rotating with the fourth link member 64 brings the front end portion 20a of the seating member 20 down rearwardly and thereby the seating surface 2s of the seat cushion 2 formed by the seating member 20 is retracted rearward.

As described above, in the seat cushion adjusting apparatus 10 of the embodiment, a variable mechanism 70, which changes the length of the seat cushion 2 based on the movement of the screw shaft 32 in the axial direction, is formed by the center pipe 22 supported on the two support shafts 23, the gear links 50, and the drum 51 described above.

That is, a rotation angle of the drum 51 for pushing and pulling the front end portion 20a of the seating member 20 disposed in the leading edge portion of the seat cushion 2 from the rear surface 20s side is determined by a longitudinal position of the center pipe 22 supporting the drum 51 via the gear link 50 (fourth link member 64 thereof). In addition, the seat load acting on the front end portion of the seat cushion 2 extended forward by the operation of the variable mechanism 70 is distributed to the two support shafts 23 fixed to both the end portions of the center pipe 22 in the axial direction. Therefore, the seat cushion adjusting apparatus 10 of the embodiment is capable of stably supporting the front end portion of the seat cushion 2 extending forward, that is, the front end portion 20a of the seating member 20.

Support Mechanism of Nut Member

A support mechanism of the nut member 31 in the seat cushion adjusting apparatus 10 of the embodiment will be described.

Figure 8:
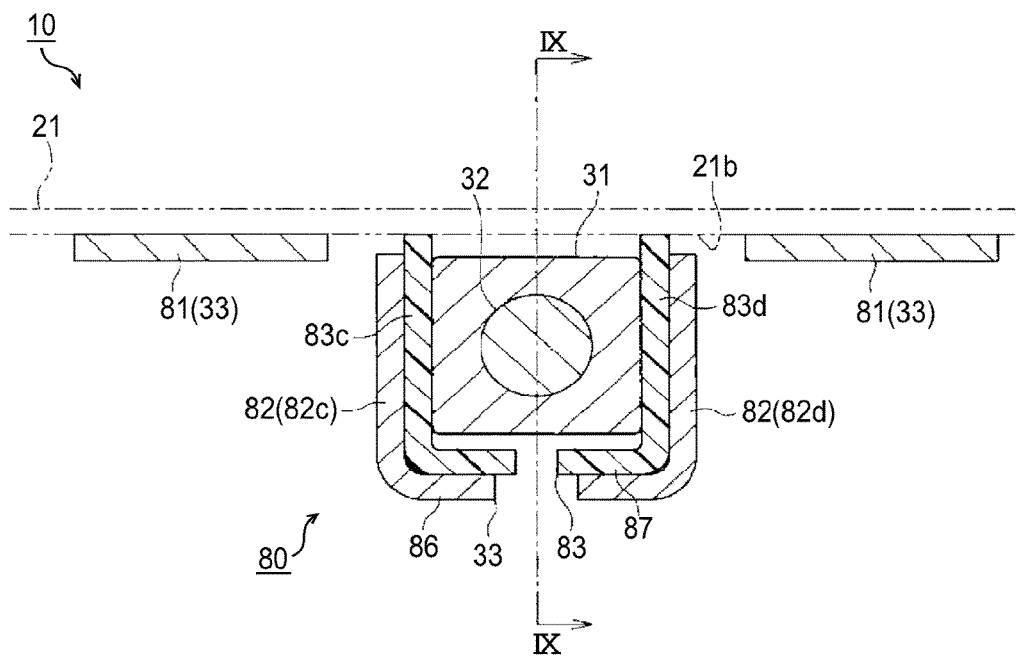
FIG. 8 is a sectional view of the seat cushion adjusting apparatus in a first embodiment (cross section that is taken along line VIII-VIII in FIG. 5)
Figure 9:
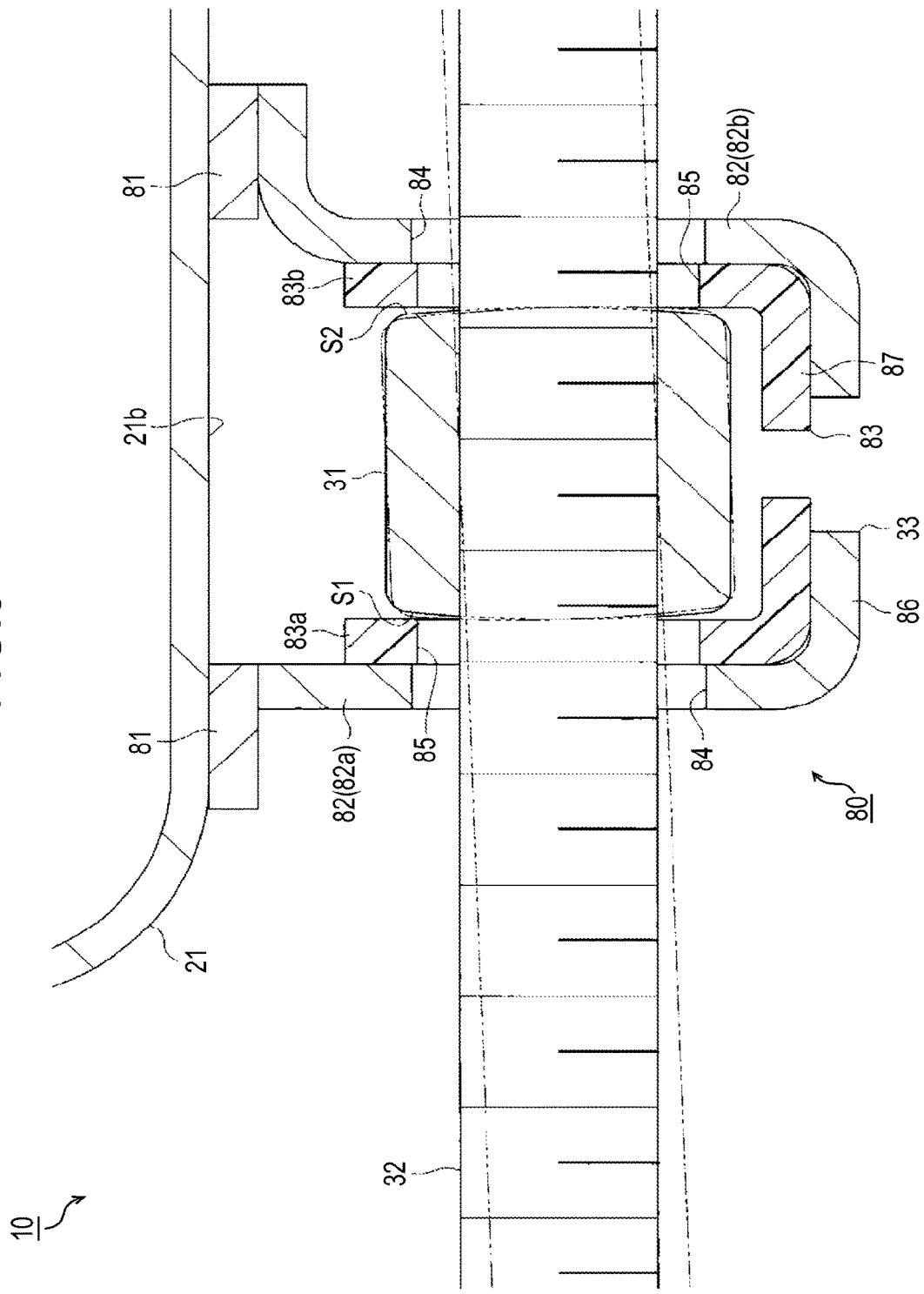
FIG. 9 is a sectional view of the seat cushion adjusting apparatus in the first embodiment (cross section that is taken along line IX-IX in FIG. 8)

As illustrated in FIGS. 8 and 9, in the seat cushion adjusting apparatus 10 of the embodiment, the holding bracket 33 configuring a nut support mechanism 80 has mounting portions 81 fixed to the lower surface 21b of the panel member 21. In addition, the nut member 31 of the embodiment has a substantially rectangular parallelepiped (cube) shape. Then, the holding bracket 33 of the embodiment includes four support walls 82 (82a to 82d) extending in a vertical direction in a manner to cross the mounting portion 81.

That is, the holding bracket 33 of the embodiment includes first support walls 82a and 82b having insertion holes 84 of the screw shaft 32 and disposed to face each other in the seat longitudinal direction (right and left direction in FIG. 9), and second support walls 82c and 82d disposed to face each other in the seat width direction (right and left direction in FIG. 8). Then, the nut member 31 of the embodiment is held in the holding bracket 33 in a manner that all sides are encompassed by each support wall 82.

More specifically, in the seat cushion adjusting apparatus 10 of the embodiment, a holder member 83 made of resin is interposed between the nut member 31 and each support wall 82 of the holding bracket 33. Specifically, similar to each support wall 82 of the holding bracket 33, the holder member 83 of the embodiment also includes each of side wall portions 83a to 83d surrounding all sides of the nut member 31. In addition, inserting holes 85 of the screw shaft 32 are formed in the side wall portions 83a and 83b facing each other in the longitudinal direction. Then, the holding bracket 33 of the embodiment is configured to interpose the nut member 31 between the first support walls 82a and 82b and the second support walls 82c and 82d, that is, in the seat longitudinal direction and the seat width direction in a configuration that the holder member 83 is interposed therebetween.

In addition, the holding bracket 33 and the holder member 83 of the embodiment respectively include bottom wall portions 86 and 87 provided in a manner continuous to lower ends of each of the support walls 82 and each of the side wall portions 83a to 83d. Therefore, the holding bracket 33 of the embodiment is configured to prevent falling off of the nut member 31 held on the inside of each support wall 82.

In addition, as illustrated in FIG. 9, in the seat cushion adjusting apparatus 10 of the embodiment, end surfaces of the nut member 31 in the axial direction respectively form curved surfaces S1 and S2 that are convex toward each of the first support walls 82a and 82b facing each other in the axial direction. Then, the nut member 31 of the embodiment is held in the holding bracket 33 in a manner that each curved surface S1 and S2 abuts against each of side wall portions 83a and 83b of the holder member 83 positioned on front side and the rear side thereof.

Specifically, each of the curved surfaces S1 and S2 is formed by moving peripheral portions rearward to a center side (to the rear side in the front end portion and to the front side in the rear end portion) in the axial direction in both the end surfaces of the nut member 31 in the axial direction. Therefore, the nut support mechanism 80 of the embodiment is configured to allow the nut member 31 supported on the lower portion of the panel member 21 and the screw shaft 32 to be integrally tilted.

That is, the screw shaft 32 extruding the front end portion 20a of the seating member 20 forward based on the operation of the cushion length variable mechanism 70 described above has a possibility that one end thereof is depressed by the seat load acting on the front end portion of the seat cushion 2. Considering this point, in this case, the seat cushion adjusting apparatus 10 of the embodiment is configured such that the screw shaft 32 and the nut member 31 are integrally tilted. Therefore, it is possible to secure smooth rotation of the screw shaft 32 in a state in which the seat cushion 2 extends forward.

Above, according to the embodiment, it is possible to obtain the following effects.

(1) The seat cushion adjusting apparatus 10 includes the nut support mechanism 80 that supports the nut member 31 on the lower portion of the panel member 21 configuring the frame of the seat cushion 2 and the variable mechanism 70 that changes the length of the seat cushion 2 based on the movement of the screw shaft 32 engaged with the nut member 31 in the axial direction. Then, the nut support mechanism 80 is configured to allow the nut member 31 and the screw shaft 32 to be integrally tilted while restricting the rotation of the nut member 31.

According to the configuration described above, even if one end of the screw shaft 32 is depressed by the seat load acting on the front end portion of the seat cushion 2, shaft deviation between the screw shaft 32 and the nut member 31 is unlikely to occur. Therefore, it is possible to smoothly adjust the length of the seat cushion 2 by suppressing an increase in the frictional resistance.

(2) The seat cushion adjusting apparatus 10 includes the holding bracket 33 having four support walls 82 (82a to 82d) surrounding all sides of the nut member 31. In addition, the holding bracket 33 configures the nut support mechanism 80 by interposing the nut member 31 between a pair of the first support walls 82a and 82b disposed to face each other in the axial direction of the screw shaft 32. Then, the curved surfaces S1 and S2 that are convex toward each of the first support walls 82a and 82b side facing end portions of the nut member 31 in the axial direction are formed in the end portions in the axial direction. Therefore, it is possible to allow the nut member 31 and the screw shaft 32 to be integrally tilted by a simple configuration.

(3) The holder member 83 made of resin is interposed between each support wall 82 and the nut member 31. Therefore, it is possible to reduce the frictional resistance of the sliding surface when the nut member 31 is tilted. As a result, it is possible to allow the nut member 31 to be integrally and smoothly tilted with the screw shaft 32. Then, in this case, the holder member 83 is elastically deformed and thereby it is possible to realize further smooth tilting.

(4) The actuator 40 is integrally moved with the center pipe 22 (and the drum 51) configuring the variable mechanism 70 in the longitudinal direction in a state in which the screw shaft 32 is driven to be rotated. It is possible to further effectively utilize the lower space of the seat cushion 2 by such a configuration.

Second Embodiment

Hereinafter, a second embodiment of a seat cushion adjusting apparatus will be described with reference to the drawings. In addition, the same reference numerals are given to the same configurations of the first embodiment described above and the description thereof will be omitted.

Figure 10:
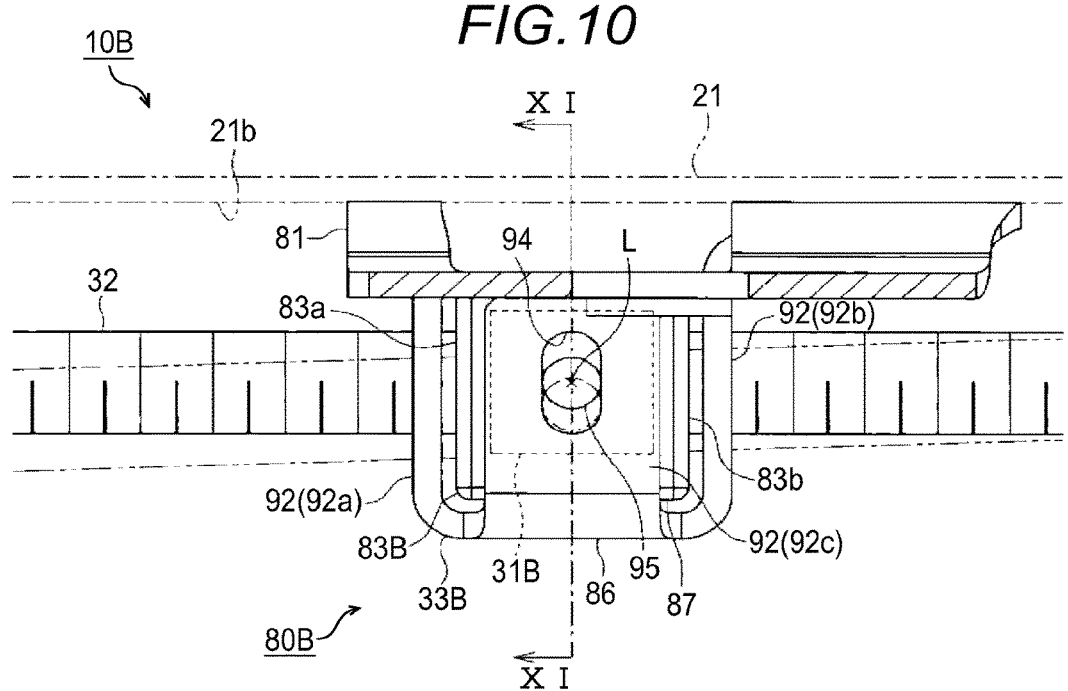
FIG. 10 is a sectional view of the seat cushion adjusting apparatus in a second embodiment (cross section that is taken along line X-X in FIG. 11)
Figure 11:
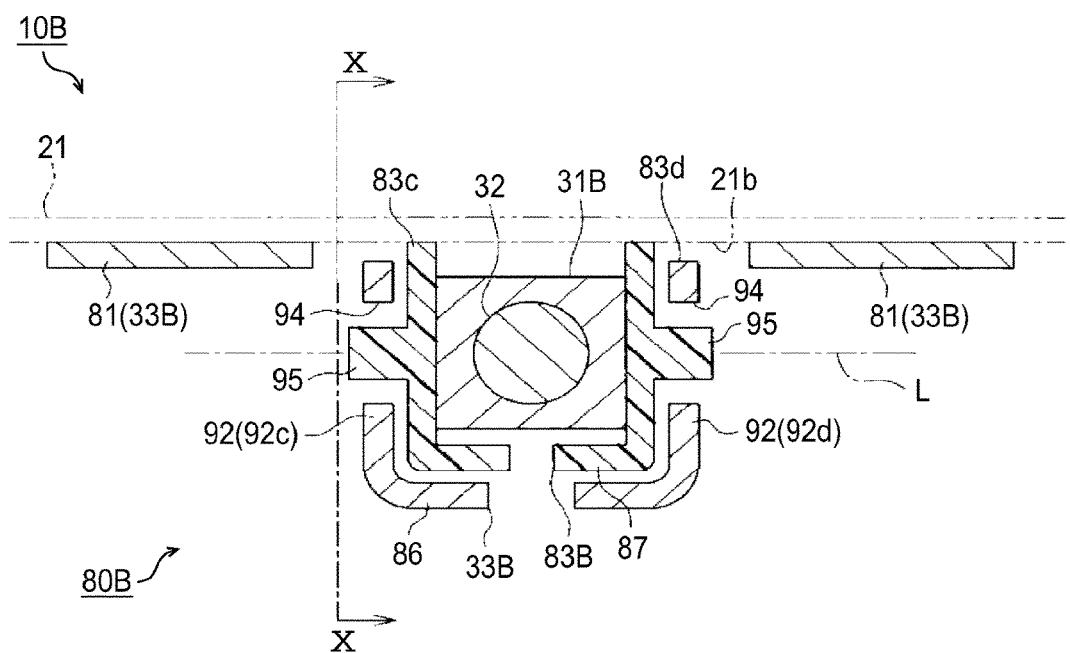
FIG. 11 is a sectional view of the seat cushion adjusting apparatus in the second embodiment (cross section that is taken along line XI-XI in FIG. 10)

As illustrated in FIGS. 10 and 11, a seat cushion adjusting apparatus 10B of the embodiment has a configuration of a nut support mechanism 80B (80) different from that of the seat cushion adjusting apparatus 10 of the first embodiment described above.

Particularly, also in the seat cushion adjusting apparatus 10B of the embodiment, a holding bracket 33B configuring the nut support mechanism 80B has four support walls 92 (92a to 92d) surrounding all sides of a nut member 31B. Then, the holding bracket 33B of the embodiment has a configuration to interpose the nut member 31B between second support walls 92c and 92d disposed to face each other in the seat width direction (right and left direction in FIG. 11).

Specifically, in the seat cushion adjusting apparatus 10B of the embodiment, a holder member 83B is configured such that four side wall portions 83a to 83d surrounding all sides of the nut member 31B come into close contact with the nut member 31B. In addition, gaps are set between each of the first support walls 92a and 92b of the holding bracket 33B facing each other in the seat longitudinal direction (right and left direction in FIG. 10) and each of side wall portions 83a and 83b of the holder member 83B, and between a bottom wall portion 86 of the holding bracket 33B and a bottom wall portion 87 of the holder member 83B. Therefore, the nut support mechanism 80B is configured such that the nut member 31B and a screw shaft 32 are integrally tilted together with the holder member 83B.

More particularly, the holding bracket 33B of the embodiment has long holes 94 respectively extending in the vertical direction in each of the second support walls 92c and 92d in which the nut member 31B is interposed in the seat width direction. In addition, the holder member 83B of the embodiment includes a pair of right and left shaft-like protrusions 95 as the shaft-like member inserted into each of the long holes 94. That is, the nut support mechanism 80B of the embodiment is configured such that the holder member 83B and the nut member 31B are rotated around a rotation axis L which is formed by both the shaft-like protrusions 95 of the holder member 83B and thereby integral tilting with the screw shaft 32 is allowed.

In addition, the holding bracket 33B of the embodiment is configured such that both the shaft-like protrusions 95 of the holder member 83B inserted into the long holes 94 in a manner to cross each of the second support walls 92c and 92d are capable of moving in an extending direction of the long holes 94. Therefore, the nut support mechanism 80B of the embodiment is configured to allow vertical movement of the nut member 31B and the screw shaft 32.

Above, it is possible to allow the nut member 31B and the screw shaft 32 to be integrally tilted more smoothly by employing the nut support mechanism 80B of the embodiment. Then, the nut member 31B and the screw shaft 32 are moved downward based on the seat load and thereby it is possible to efficiently distribute and support the seat load to and on the center pipe 22 and each support shaft 23 configuring the variable mechanism 70.

Moreover, each embodiment described above may be changed as follows.

In each embodiment described above, the drum 51 that is rotated while moving in the longitudinal direction based on the operation of the gear links 50 is fixed to the front end portion 20a (rear surface 20s thereof) of the seating member 20 and thereby the variable mechanism 70 is formed. However, this disclosure is not limited to the embodiment and the configuration of the cushion length variable mechanism 70 may be arbitrarily changed as long as the length of the seat cushion 2 is changed based on the movement of the screw shaft 32 engaged with the nut member 31 supported on the frame of the seat cushion 2 in the axial direction. For example, a support member corresponding to the center pipe 22 or the drum 51 may be simply moved in the longitudinal direction. Then, the support member may be simply rotated.

In each embodiment described above, the seat cushion adjusting apparatus 10 (10B) includes the panel member 21 forming the frame of the seat cushion 2 by being fixed to the side frame of the seat cushion 2. Then, the nut support mechanism 80 (80B) includes the holding bracket 33 (33B) supporting the nut member 31 (31B) in a state of being fixed to the lower surface 21b of the panel member 21. However, this disclosure is not limited to the embodiment and a support position of the nut member 31 with respect to the frame of the seat cushion 2 may be arbitrarily changed. Then, the configuration of the nut support mechanism 80 may also be arbitrarily changed as long as integral tilting of the nut member 31 and the screw shaft 32 is allowed while restricting the rotation of the nut member 31.

In the first embodiment described above, the nut member 31 and the screw shaft 32 are integrally tilted on the inside of the holder member 83 interposed between the holding bracket 33 and the nut member 31. Then, both the end surfaces of the nut member 31 in the axial direction are the curved surfaces S1 and S2 that are convex toward each of the first support walls 82a and 82b side facing the end portions in the axial direction. However, this disclosure is not limited to the embodiment. The curved surfaces may not be essentially directly formed on the end surfaces of the nut member 31 in the axial direction and may be formed in separated members integrally tilting with the nut member 31 provided in the end portions of the nut member 31 in the axial direction.

Figure 12:
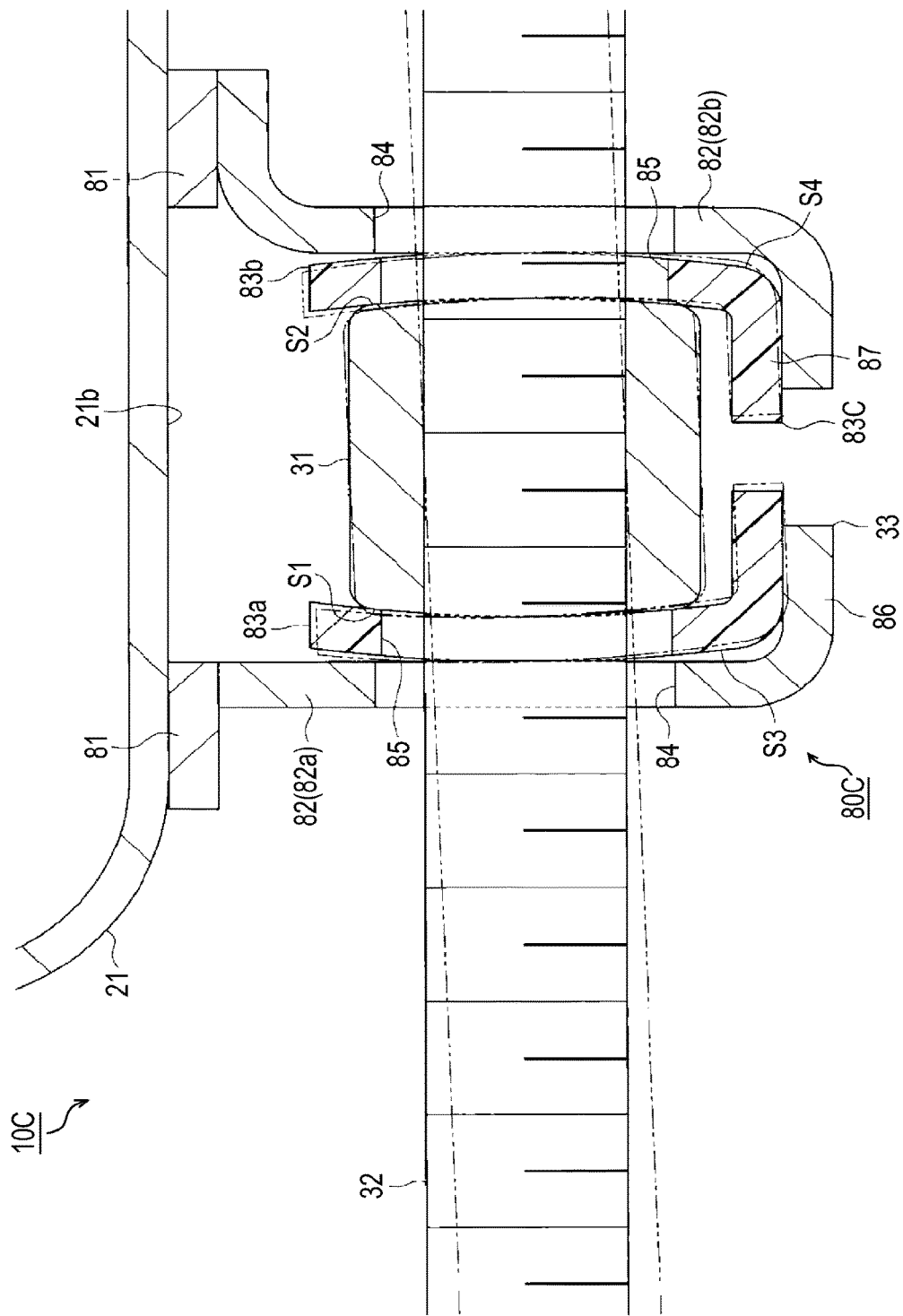
FIG. 12 is a sectional view of a seat cushion adjusting apparatus of another example along an axis of a screw shaft.

For example, as a nut support mechanism 80C of a seat cushion adjusting apparatus 10C illustrated in FIG. 12, a holder member 83C is configured so as to be integrally tilted with the nut member 31 and the screw shaft 32. In addition, the holder member 83C is configured such that both side wall portions 83a and 83b positioned in the seat longitudinal direction are formed in a curved shape coming into close contact with the curved surfaces S1 and S2 formed in the nut member 31. Therefore, curved surfaces S3 and S4 formed by each of the side wall portions 83a and 83b of the holder member 83C may be configured to abut against each of the first support walls 82a and 82b of the holding bracket 33.

Furthermore, in this case, the nut member may not have the curved surfaces and may be configured such that only the holding bracket has the curved surfaces. Then, it may be configured to include a curved surface forming member other than the holding bracket.

In the second embodiment described above, the long holes 94 extending in the vertical direction are respectively formed in each of the second support walls 92c and 92d of the holding bracket 33B. Furthermore, the pair of right and left shaft-like protrusions 95 inserted into each of the long holes 94 are formed in the holder member 83B integrally provided with the nut member 31B. Then, the holder member 83B and the nut member 31B are configured to be rotated around the rotation axis L that is formed by both the shaft-like protrusions 95 of the holder member 83B. However, this disclosure is not limited to the embodiment and the configuration may be arbitrarily changed as long as the nut member 31B has the rotation axis L crossing each second support wall of the holding bracket 33B.

For example, the pair of right and left shaft-like protrusions forming the rotation axis L may be configured to be formed in the nut member. In addition, the pair of right and left shaft-like protrusions are formed in each of the second support walls 92c and 92d of the holding bracket 33B. Then, a configuration, in which concave portions forming the rotation axis L are provided on the nut member 31 side by engagement with the shaft-like protrusions, may be provided. Furthermore, the movement of the nut member in the vertical direction may not be allowed. Then, a structure, in which the nut member 31 is interposed between a pair of the first support walls 82a and 82b facing each other in the axial direction of the screw shaft 32, may be also used as the nut support mechanism 80 in the first embodiment.

Furthermore, if a structure, in which the nut member 31 is interposed between the first support walls 82a and 82b facing each other in the axial direction of the screw shaft 32, is employed as the nut support mechanism 80 in the first embodiment, the second support walls 82c and 82d facing each other in the seat width direction may not be essentially provided. Then, if a structure, in which the nut member 31B is interposed between the second support walls 92c and 92d, is employed as the nut support mechanism 80B in the second embodiment, both the first support walls 92a and 92b facing each other in the axial direction of the screw shaft 32 may not be essentially provided.

In each embodiment described above, the nut member 31 has a substantially rectangular parallelepiped (cube) shape. However, this disclosure is not limited to the embodiment and, for example, the shape of the nut member 31 may be arbitrarily changed such as those having a hexagonal cross section and a circular cross section. Then, a material thereof may be metal or may be a non-metal such as resin.

Next, technical ideas that can be grasped from the embodiments described above are described together with effects.

(A) The seat cushion adjusting apparatus, in which the holder member has the curved surfaces and is integrally tilted with the screw shaft and the nut member, is provided.

(B) The seat cushion adjusting apparatus, in which the holder member has the rotation axis and is integrally tilted with the screw shaft and the nut member, is provided.

According to each configuration described above, it is possible to form the nut support mechanism allowing integral tilting of the nut member and the screw shaft with a simple configuration and easy formation.

It is preferable that a seat cushion adjusting apparatus according to an aspect of this disclosure includes a nut support mechanism that supports a nut member on a frame of a seat cushion; and a variable mechanism that changes a length of the seat cushion based on an axial movement of a screw shaft screwed to the nut member. The nut support mechanism preferably allows the nut member and the screw shaft to be integrally tilted while restricting rotation of the nut member.

According to this configuration, even if one end of the screw shaft is depressed by a seat load acting on a front end portion of the seat cushion, axial displacement between the screw shaft and the nut member is unlikely to occur. Then, accordingly, an increase in frictional resistance is suppressed and thereby it is possible to smoothly adjust a length of the seat cushion.

In the seat cushion adjusting apparatus according to the aspect of this disclosure, it is preferable that the nut support mechanism interposes the nut member between a pair of support walls disposed to face each other in an axial direction of the screw shaft, and curved surfaces, which are convex toward the support walls facing end portions of the nut member in the axial direction, are formed in the end portions in the axial direction.

According to this configuration, it is possible to allow integral tilting of the nut member and the screw shaft with a simple configuration by making the curved surfaces an abutting portion.

In the seat cushion adjusting apparatus according to the aspect of this disclosure, it is preferable that the nut support mechanism includes a pair of support walls provided in positions interposing the nut member in a seat width direction, and the nut member has a rotation axis crossing both the support walls in the seat width direction.

According to this configuration, it is possible to smoothly allow integral tilting of the nut member and the screw shaft around the rotation axis with a simple configuration.

In the seat cushion adjusting apparatus according to the aspect of this disclosure, it is preferable that long holes extending in a vertical direction are formed in both the support walls in the seat width direction and the rotation axis of the nut member is formed by a shaft-like member inserted through the long holes.

According to this configuration, the shaft-like member is moved within the long holes along an extending direction thereof and thereby vertical movements of the nut member and the screw shaft are allowed. Then, accordingly, it is possible to efficiently support the seat load by dispersing the seat load to, for example, configurations other than the screw shaft such as a support member configuring the variable mechanism.

In the seat cushion adjusting apparatus according to the aspect of this disclosure, it is preferable that a holder member capable of elastically deforming is interposed between the support wall and the nut member.

In the seat cushion adjusting apparatus according to the aspect of this disclosure, it is preferable that the holder member is made of resin.

According to these configurations, it is possible to reduce the frictional resistance of a sliding surface thereof when the nut member is tilted. As a result, it is possible to tilt the nut member and the screw shaft smoothly and integrally. Then, in this case, the holder member is elastically deformed and thereby it is possible to realize further smooth tilting.

In the seat cushion adjusting apparatus according to the aspect of this disclosure, it is preferable that the holder member has the curved surfaces and is integrally tilted with the screw shaft and the nut member.

In the seat cushion adjusting apparatus according to the aspect of this disclosure, it is preferable that the holder member has the rotation axis and is integrally tilted with the screw shaft and the nut member.

According to the aspect of this disclosure, it is possible to further smoothly adjust the length of the seat cushion.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A seat cushion adjusting apparatus comprising:
   a nut support mechanism that supports a nut member on a frame of a seat cushion; and
   a variable mechanism that changes a length of the seat cushion based on an axial movement of a screw shaft screwed to the nut member,
   wherein the nut support mechanism allows the nut member and the screw shaft to be integrally tilted while restricting rotation of the nut member, and
   wherein the nut support mechanism interposes the nut member between a pair of support walls disposed to face each other in an axial direction of the screw shaft, the nut member being arranged in a space defined by the support walls in the axial direction.

2. The seat cushion adjusting apparatus according to claim 1,
   wherein curved surfaces, which are convex toward the support walls facing end portions of the nut member in the axial direction, are formed in the end portions in the axial direction.

3. The seat cushion adjusting apparatus according to claim 2,
   wherein a holder member that is elastically deformable is interposed between the support wall and the nut member.

4. The seat cushion adjusting apparatus according to claim 3,
   wherein the holder member is made of resin.

5. The seat cushion adjusting apparatus according to claim 3,
   wherein the holder member has the curved surfaces and is integrally tilted with the screw shaft and the nut member.

6. The seat cushion adjusting apparatus according to claim 3,
   wherein the holder member has the rotation axis and is integrally tilted with the screw shaft and the nut member.

7. The seat cushion adjusting apparatus according to claim 1,
   wherein the nut support mechanism includes a pair of support walls provided in positions interposing the nut member in a seat width direction, and
   wherein the nut member has a rotation axis crossing both the support walls in the seat width direction.

8. The seat cushion adjusting apparatus according to claim 7,
   wherein long holes extending in a vertical direction are formed in both the support walls in the seat width direction and the rotation axis of the nut member is formed by a protrusion inserted through the long holes.

9. A seat cushion adjusting apparatus comprising:
   a nut support mechanism that supports a nut member on a frame of a seat cushion; and
   a variable mechanism that changes a length of the seat cushion based on an axial movement of a screw shaft screwed to the nut member,
   wherein the nut support mechanism interposes the nut member between a pair of first support walls disposed to face each other in an axial direction of the screw shaft,
   wherein the nut support mechanism interposes the nut member between a pair of second support walls disposed to face each other in a seat width direction,
   wherein the nut member is surrounded by the first and second support walls, and
   wherein the nut support mechanism allows the nut member and the screw shaft to be integrally tilted while restricting rotation of the nut member.

10. A seat cushion adjusting apparatus comprising:
    a nut support mechanism that supports a nut member on a frame of a seat cushion; and
    a variable mechanism that changes a length of the seat cushion based on an axial movement of a screw shaft screwed to the nut member,
    wherein the nut member includes end portions facing axial directions of the screw shaft,
    wherein each of the end portions has a curved surface that is outwardly convex in the axial directions, and
    wherein the nut support mechanism allows the nut member and the screw shaft to be integrally tilted while restricting rotation of the nut member.

* * * * *